Sept. 14, 1954   H. R. RICARDO   2,688,955
FLUID PRESSURE ENGINE OF THE UNIFLOW TYPE
Filed May 26, 1952   3 Sheets-Sheet 1
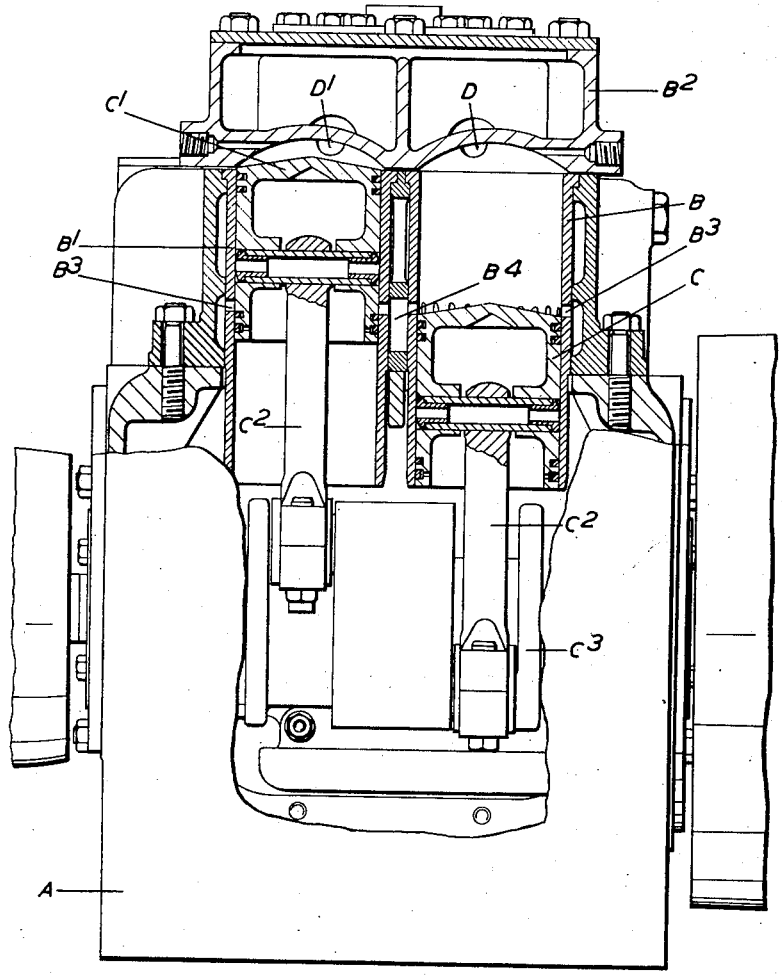

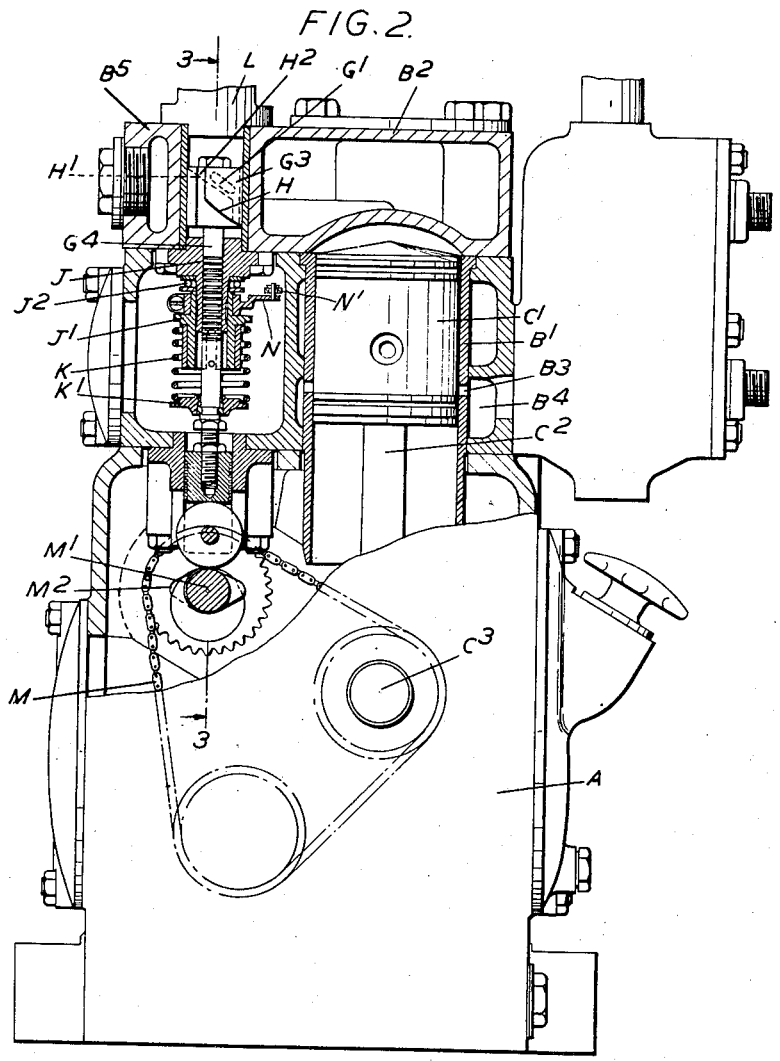

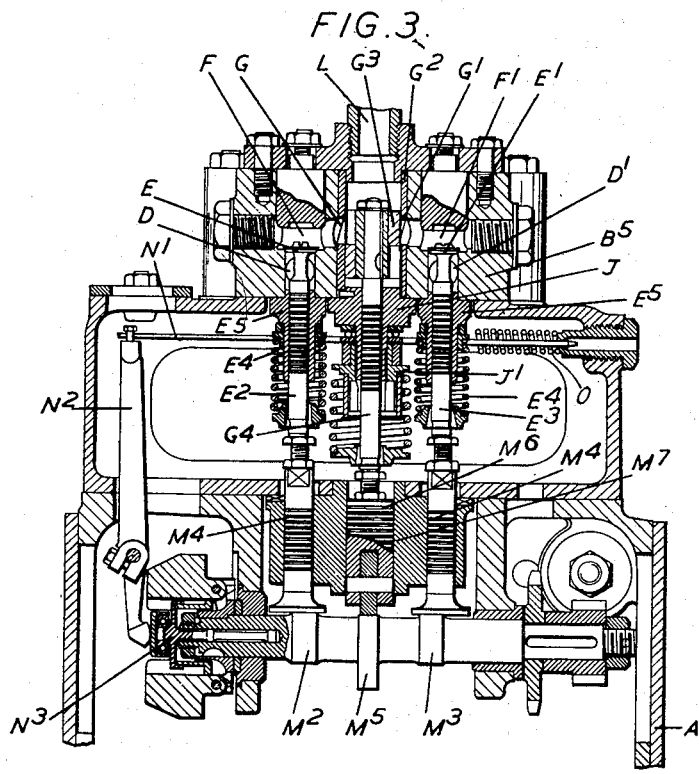

Patented Sept. 14, 1954

2,688,955

UNITED STATES PATENT OFFICE 2,688,955

FLUID PRESSURE ENGINE OF THE UNIFLOW TYPE

Harry Ralph Ricardo, London, England, assignor to National Research Development Corporation, London, England Application May 26, 1952, Serial No. 290,027

Claims priority, application Great Britain May 29, 1951

14 Claims. (Cl. 121—146)

1

This invention relates to reciprocating fluid pressure engines of the uniflow type, that is to say of the type in which the admission of the working fluid, which will usually be steam or compressed air to one end of each working chamber is controlled by admission valve apparatus, while the exhaust takes place through one or more exhaust ports at the other end of the working chamber uncovered by the piston towards the end of its working stroke, and is particularly but not exclusively applicable to engines of this type intended to operate at relatively high rotational speeds.

For convenience herein it will be assumed that the engine is of the single acting type, but it will be understood that the invention is also applicable to double acting uniflow fluid pressure engines, in which case valve apparatus according to the invention would be associated with the working chambers respectively at the two ends of each working cylinder.

In uniflow engines using steam or other vapour or gas as the working medium it will be apparent that, as the hot fluid is admitted at one end of the working chamber and after expansion exhausted at the other end thereof, a relatively steep temperature gradient will be maintained along the length of the cylinder since, not only is there no cooling of the inlet passage by outflow therethrough of relatively cool expanded exhaust fluid but the fluid remaining in the cylinder is compressed during the non-working stroke and its temperature thus raised. In a steam engine this has the advantage that losses by condensation within the cylinder are reduced or eliminated and it becomes possible to operate efficiently with a high expansion ratio, even when using saturated steam. Similar advantages are also obtained, although to a lesser extent, in a compressed air engine since although in such engines there are no serious losses due to condensation, a large expansion ratio involves very low terminal temperatures which tends to give rise to trouble due to freezing.

In engines of the uniflow type it is practicable and most desirable that control of power output should be by varying the ratio of expansion rather than by varying the admission pressure by throttling, while moreover if the engine is governed by a centrifugal or other type of speed responsive governor it is important that frictional losses between the governor and the apparatus actuated by it shall be as low as possible. In the case of control by a throttle valve, the necessity for a steam tight gland through which its spindle passes with the friction inseparable

2 from such a gland, imposes an additional disadvantage of such a method of control.

An object of the present invention is to provide admission valve apparatus for a uniflow fluid pressure engine which will enable a sharp cut-off of working fluid to be obtained, will enable the cut-off point to be controlled to the required degree, while imposing little load due to friction on the governor or other apparatus by which such control is effected, and will tend to avoid leakage of working fluid through the admission valve apparatus.

According to the present invention a uniflow fluid pressure engine has admission valve apparatus comprising two valves arranged in series with one another one of which constitutes a cut-off valve and is in the form of a piston valve having a circumferentially extending cut-off edge which cooperates with the cut-off edge of an associated port in its cylinder in such manner that the point in the reciprocating movement of the valve at which it closes its associated port can be varied by rotational movement of the valve relatively to its cylinder, while the other constitutes an admission valve which opens to initiate admission of working fluid when the piston valve is already open.

In some cases the rotational movement of the piston valve relatively to its cylinder to vary the cut-off point may be effected by rotation of the cylinder while the valve remains rotationally stationary, but in most cases would be effected by rotation of the piston valve, the cylinder remaining stationary, and it will for convenience be assumed herein that this latter arrangement is employed.

Preferably the admission valve is of the poppet type in view of the comparative ease with which such valves can be made and maintained substantially fluid-tight and in view of their general simplicity and reliability.

It will be seen that with an arrangement according to the invention a sharp cut-off can be obtained since the piston valve can be arranged so that cut-off occurs at a time when it is travelling at or near its maximum velocity, while moreover the cooperating cut-off edges respectively on the valve and the port in its cylinder can if desired lie approximately parallel to one another so as to increase the sharpness of cut-off. Moreover any small leakage past the piston valve will be relatively unimportant because any fluid leaking through the piston valve can enter the cylinder only during the working stroke, that is to say the period when the poppet valve is open.

According to a further feature of the invention, while the form of the cut-off edge on the piston valve and of the cooperating port are such as to enable the point of cut-off to be varied as is required to cover all conditions from idling to normal full load, the piston may in addition be formed so that in a rotational position beyond the maximum normal load end of its rotational travel, it maintains its cooperating port in its cylinder continuously open so that in this position the admission of working fluid to the working cylinder is effected solely by the poppet or other admission valve, which will thus have a total opening period such as to provide a cut-off point suited to extreme overload conditions, say a point in the working piston stroke only 20% to 25% before the end of such stroke.

Where the uniflow fluid pressure engine has one or more pairs of cylinders the pistons in the cylinders of each pair performing their working stroke alternately, such a pair of cylinders may have associated with it a single piston type cut-off valve having two cut-off edges respectively controlling ports leading to admission passages for admission of working fluid to the two cylinders, with a separate admission valve in each admission passage.

The details of construction and mechanism for operating the valve in an engine having valve apparatus according to the invention may vary but one construction according to the invention as applied to an engine having a pair of cylinders the pistons in which perform their working strokes alternately as above mentioned, is illustrated by way of example in the accompanying drawings, in which:

Figure 1 is a side elevation partly in section of the engine as a whole,

Figure 2 is an end elevation, also partly in section of the engine shown in Figure 1, the section being taken for convenience partly through the axis of the piston valve and partly through the axis of one of the working cylinders, Figure 3 is a cross-section through the valve apparatus of the engine taken on the line 3—3 of Figure 2.

In the construction illustrated the engine comprises a crank case $A$ on which are mounted two cylinders $B$, $B^1$ in which are arranged to reciprocate working pistons $C$, $C^1$ connected by connecting rods $C^2$ to cranks on a crankshaft $C^3$ mounted within the crank case $A$, the cranks being angularly displaced from one another by 180° so that the pistons $C$, $C^1$ perform their working strokes alternately. The upper ends of the cylinders $B$, $B^1$ are closed by a cylinder head $B^2$ in which are formed admission passages $D$, $D^1$ for the admission of working fluid, assumed to be steam, while the cylinders $B$, $B^1$ contain exhaust ports $B^3$ arranged to be uncovered by the pistons $C$, $C^1$ at the ends of their working strokes and leading into an exhaust gallery indicated generally at $B^4$.

Formed integral with the cylinder head $B^2$ is a valve housing $B^5$ into which the passages $D$, $D^1$ extend as shown in Figure 3.

As shown in Figure 3, the valve housing $B^5$ contains two poppet valves $E$, $E^1$ having stems $E^2$, $E^3$ and arranged respectively to control communication between the passages $D$ and $D^1$ and chambers $F$ and $F^1$. The chambers $F$ and $F^1$ communicate respectively with ports $G$ and $G^1$ in a cylinder $G^2$, which ports are controlled by a piston valve $G^3$ mounted upon a piston rod $G^4$.

The piston valve $G^3$ is provided with two cut-off edges $H$, $H^1$ arranged to cooperate respectively with the ports $G$ and $G^1$ so that during normal operation the cut-off edge $H^1$ closes the port $G^1$ at a point in the upstroke of the piston valve $G^3$ while the cut-off edge $H$ closes the port $G$ at a point in the downstroke of the piston valve $G^3$. Each of the cut-off edges $H$ and $H^1$ is inclined to planes normal to the axis of the piston valve $G^3$ while the cooperating edges of the ports $G$ and $G^1$ are similarly inclined so that comparatively rapid opening and closing of the ports $G$ and $G^1$ as the cut-off edges $H$ and $H^1$ pass across them is effected.

The stem $G^4$ of the piston valve $G^3$ passes through a guide member $J$ and, where it extends below this guide member, is provided with longitudinal grooves which are engaged by tongues on a sleeve $J^1$ mounted to rotate upon the guide member $J$ and serving as an abutment for one end of a spring $K$ the other end of which acts on a collar $K^1$ on the stem $G^4$. A ball bearing $J^2$ is interposed between the upper end of the sleeve $J^1$ and the guide member $J$ to take the thrust of the spring $K$ while permitting comparatively free rotation of the sleeve $J^1$ relatively to the guide member $J$.

It will thus be seen that by rocking the sleeve $J^1$ the stem $G^4$ and piston valve $G^3$ can be rocked about their common axis, and that this rocking movement will vary the points in the reciprocating movement of the piston valve $G^3$ at which the cut-off edges $H$ and $H^1$ pass over the cooperating edges of the ports $G$ and $G^1$.

As will be apparent from Figure 2, there is associated with each of the cut-off edges $H$ and $H^1$ a groove $H^2$ which extends longitudinally to and through the end of the piston valve $G^3$ remote from the cut-off edge. These grooves $H^2$ serve to maintain continuous communication between the ends of the cylinder $G^2$ and also serve another purpose hereinafter described. The upper end of the cylinder $G^2$ communicates with the steam inlet passage $L$.

The poppet valves $E^2$, $E^3$ are normally maintained closed by springs $E^4$ while they pass through guide members $E^5$, the stems $E^2$, $E^3$ and $G^4$ all being formed so as to provide in effect labyrinth packings resisting leakage between them and their guide members.

Arranged within the crank case $A$ so as to be driven at crankshaft speed, for example by a chain $M$, is a camshaft $M^1$ through the axis of rotation of which passes the axes of the stems $E^2$, $E^3$ and $G^4$. The camshaft $M^1$ is provided with cams $M^2$ and $M^3$ arranged to act respectively on tappet members $M^4$ which actuate the valves $E$ and $E^1$ and with an eccentric $M^5$ which acts on a tappet member $M^6$ acting on the stem $G^4$ to effect the reciprocation of the piston valve $G^3$, the usual type of adjusting means being provided between the tappets $M^4$ and $M^6$ and the stems $E^2$, $E^3$ and $G^4$ of the valves which they operate. The tappet members $M^4$ and $M^6$ pass through a suitable guide block $M^7$ and are formed to resist leakage past them in both the upward and downward direction. The lobes of the cams $M^2$, $M^3$ are angularly displaced from one another by 180° so as to lift the valves $E$ and $E^1$ alternately while the eccentric $M^5$ has its highest and lowest points displaced by 90° from the lobes of the cams $M^2$ and $M^3$ as shown most clearly in Figure 2.

The sleeve $J^1$ has rigidly but adjustably connected to it an arm $N$ arranged to be acted upon by a rod $N^1$ actuated by one end of a lever $N^2$ controlled by a centrifugal governor indicated at $N^3$ against the action of a spring indicated at O so that operation of the governor causes rocking of the sleeve $J^1$ and hence of the piston valve $G^3$.

Alternatively a gear wheel might be mounted upon the sleeve $J^1$ and engaged by a rack longitudinally movable by the lever $N^2$ against the action of a spring.

The operation of the valve apparatus is as follows:

At approximately the moment when each of the working pistons C, $C^1$ reaches its top dead centre position, the appropriate cam $M^2$ or $M^3$ begins to lift its associated poppet valve E or $E^1$, at which time the associated port G or $G^1$ is uncovered by the cooperating cut-off edge H or $H^1$ so that working fluid is admitted from the supply passage L through the port G or $G^1$, the chamber F or $F^1$, the valve E or $E^1$ and the passage D or $D^1$ to the appropriate working cylinder. As the piston moves downwards on its working stroke the cam $M^5$ raises or lowers the piston valve $G^3$ as the case may be until at a point in the working stroke of the piston valve determined by its rotational position the appropriate cut-off edge H or $H^1$ on the piston valve $G^3$ closes the appropriate port G or $G^1$ and thus effects cut-off of working fluid from the working cylinder.

When the working piston referred to reaches the end of its working stroke exhaust takes place through the exhaust ports $B^3$ in the normal manner for a uniflow steam engine, and the other piston will then be at its top dead centre position. The other of the cams $M^2$, $M^3$ now begins to lift its associated valve E or $E^1$ so that working fluid is now admitted to the other working cylinder and is subsequently cut off therefrom by the piston valve $G^3$ at an appropriate point in the stroke of the working piston, again determined by the rotational position of the piston valve $G^3$.

The rotational position of the piston valve $G^3$ is controlled by the governor so as to retard the cut-off point with reductions in speed of the engine and vice versa, while the speed setting can be controlled by adjustment of the spring O which acts upon the governor mechanism.

If the load on the engine exceeds some predetermined value it will moreover be apparent that the governor will rotate the piston valve $G^3$ to a point at which the grooves $H^2$ come into register with the ports G, $G^1$ so that these ports remain permanently open, whereupon both the admission and the cut-off of working fluid is effected solely by the valves E, $E^1$, the conditions under which this can occur being the extreme overload conditions. The cams $M^2$ and $M^3$ are therefore so designed as to cause the valves E and $E^1$ to close at the points in the working strokes of their respective working pistons representing the cut-off points for maximum overload.

It will be apparent that during the whole of the period when each working piston is performing its idle stroke its associated valve E or $E^1$ will be closed so that the period during which unwanted escape of working fluid from the admission passage L into either working cylinder through the piston valve $G^3$ can occur is limited to the periods of each working stroke following cut-off, when not only is there back pressure in the working cylinder to resist such leakage but any small leakage is of little moment.

It will moreover be seen that since the piston valve $G^3$ is constantly reciprocating the force required of the governor to move it rotationally will be small.

What I claim as my invention and desire to secure by Letters Patent is:

1. A uniflow fluid pressure engine comprising at least one working cylinder having a working fluid inlet port adjacent to its head and at least one exhaust port in its wall and a piston reciprocating within the working cylinder and arranged to uncover the exhaust port at the end of each working stroke, and admission valve apparatus comprising two valves arranged in series with one another, one of which constitutes a cut-off valve and is in the form of a piston valve operating within a cylinder and having a circumferentially extending cut-off edge which cooperates with the cut-off edge in an associated port in its cylinder in such manner that the point in the reciprocating movement of the piston valve at which it closes the said associated port will vary with rotational movement of the valve relatively to its cylinder while the other constitutes an admission valve which opens to initiate admission of working fluid to the cylinder at a time in each cycle when the piston valve is already open.

2. A uniflow fluid pressure engine as claimed in claim 1 in which the admission valve is of the poppet type.

3. A uniflow fluid pressure engine as claimed in claim 2 including speed responsive governor mechanism and means whereby the governor mechanism imparts rotational movement to the piston of the cut-off valve relatively to its cylinder with changes in engine speed.

4. A uniflow fluid pressure engine as claimed in claim 3 in which the admission valve remains open during each cycle to a point in the working piston stroke representing the cut-off point for maximum load and the cut-off valve is formed so that when moved into an appropriate rotational position relative to its cylinder it remains open for at least the whole period of opening of the admission valve.

5. A uniflow fluid pressure engine as claimed in claim 4 in which when the cut-off valve is moved into the said appropriate rotational position it remains open continuously.

6. A uniflow fluid pressure engine as claimed in claim 1 in which the admission valve remains open during each cycle to a point in the working piston stroke representing the cut-off point for maximum load and the cut-off valve is formed so that when moved into an appropriate rotational position relative to its cylinder it remains open for at least the whole period of opening of the admission valve.

7. A uniflow fluid pressure engine as claimed in claim 6 in which the admission valve is of the poppet type.

8. A uniflow fluid pressure engine as claimed in claim 1 in which the cut-off valve has operating mechanism including a rod co-axial and rigid therewith, a sleeve surrounding the rod and relatively to which the rod reciprocates but cannot rotate, and means for imparting rotational movement to the sleeve and hence to the rod and cut-off valve to vary the point of cut-off.

9. A uniflow fluid pressure engine as claimed in claim 1 in which the admission valve lies between the cut-off and the inlet port in the head of the working cylinder.

10. A uniflow fluid pressure engine as claimed in claim 9 in which the admission valve is of the poppet type.

11. A uniflow fluid pressure engine comprising a pair of working cylinders, working pistons in the working cylinders, a crankshaft having cranks disposed at 180° to one another, connecting rods connecting the cranks respectively to the working pistons whereby their working strokes occur alternately, and admission valve apparatus comprising a cut-off valve in the form of a piston valve operating within a cylinder and having two circumferentially extending cut-off edges co-operating respectively with the cut-off edges of associated ports in the cylinder for admission of working fluid respectively to the working cylinders in such manner that the points in the reciprocating movement of the piston valve at which it respectively closes such ports are varied similarly by rotation of the valve relatively to its cylinder, two admission valves in series respectively with the two ports and valve operating mechanism arranged to open the admission ports alternately to initiate admission of working fluid respectively to each of two working cylinders during period when the respective associated port in the cylinder of the piston valve is already open.

12. A uniflow fluid pressure engine as claimed in claim 10 in which each admission valve is in the form of a poppet valve and lies between the appropriate port controlled by the piston valve and its associated working cylinder.

13. A uniflow fluid pressure engine as claimed in claim 11 in which each admission valve remains open during each cycle to a point in the stroke of its associated working piston representing the cut-off point for maximum load, and the cut-off valve is formed so that when moved into an appropriate rotational position relatively to its cylinder each of the ports controlled thereby remains open for at least the whole period of opening of its associated admission valve.

14. A uniflow fluid pressure engine as claimed in claim 12 in which the cut-off valve has axially extending slots in its circumferential wall which register with the ports in its cylinder when the valve occupies the said appropriate rotational position so as to maintain such ports continuously open and which also serve at all times as communicating passages for the passage of working fluid from one end to the other of the cylinder of the cut-off valve.

References Cited in the file of this patent

UNITED STATES PATENTS

| Number | Name | Date |
|---|---|---|
| 1,605,657 | Ellis | Nov. 2, 1926 |